United States Patent
Baggett et al.

(10) Patent No.: US 7,562,027 B1
(45) Date of Patent: Jul. 14, 2009

(54) AVAILABILITY PROCESSING IN A TRAVEL PLANNING SYSTEM

(75) Inventors: David Baggett, Hermosa Beach, CA (US); Gregory R. Galperin, Cambridge, MA (US); Carl G. DeMarcken, Cambridge, MA (US)

(73) Assignee: ITA Software, Inc., Cambridge, MA (US)

( * ) Notice: Subject to any disclaimer, the term of this patent is extended or adjusted under 35 U.S.C. 154(b) by 798 days.

(21) Appl. No.: 09/431,674

(22) Filed: Nov. 1, 1999

(51) Int. Cl.
*G06Q 10/00* (2006.01)
*G06G 7/00* (2006.01)
*G06F 17/30* (2006.01)
*G06F 7/00* (2006.01)

(52) U.S. Cl. ............... 705/5; 705/1; 705/400; 707/3

(58) Field of Classification Search .......... 705/5, 705/6
See application file for complete search history.

(56) References Cited

U.S. PATENT DOCUMENTS

| | | | | |
|---|---|---|---|---|
| 4,862,357 A | * | 8/1989 | Ahlstrom et al. ............. | 705/6 |
| 5,270,921 A | * | 12/1993 | Hornick ...................... | 705/6 |
| 5,570,283 A | | 10/1996 | Shoolery et al. .............. | 705/5 |
| 5,652,867 A | | 7/1997 | Barlow et al. ................ | 703/6 |
| 5,832,453 A | * | 11/1998 | O'Brien ...................... | 705/6 |
| 5,839,114 A | * | 11/1998 | Lynch et al. ................. | 705/5 |
| 5,897,620 A | * | 4/1999 | Walker et al. ................ | 705/1 |
| 5,983,200 A | * | 11/1999 | Slotznick ..................... | 705/1 |
| 5,983,220 A | * | 11/1999 | Schmitt ....................... | 707/5 |
| 6,119,094 A | * | 9/2000 | Lynch et al. ................. | 705/5 |
| 6,418,438 B1 | * | 7/2002 | Campbell ..................... | 707/8 |

FOREIGN PATENT DOCUMENTS

JP 07230509 A * 8/1995

OTHER PUBLICATIONS

Johnston, Marsha W. "Amadeus Takes on Sabre", Jun. 1993, Software Magazine, vol. 13 issue 9, p. 36.*
"Fly with the OAG Electronic Edition", Oct. 1984, Retrieved from Dialog Chronology (File No. 410).*
"Travel Industry Embraces Internet Travel Network as a Leading Web-Based Solution", Jul. 22, 1996, Business Wire.*
Baglino, Ken; "Hoteliers Report Advances In Booking Systems," Jun. 21, 1993, Tour & Travel, p. 34.*

* cited by examiner

*Primary Examiner*—C. Luke Gilligan
*Assistant Examiner*—Rachel L Porter
(74) *Attorney, Agent, or Firm*—Fish & Richardson P.C.

(57) ABSTRACT

A travel planning system that implements seat availability determinations is described. The planning system includes a scheduling process for determining a set of instances of transportation that satisfy a user query and a faring process that determines fares valid for at least some of the instances in the set of instances of transportation. The travel planning system also includes an availability process that uses results from a single source of seat availability for a mode of transportation to determine a set of available instances of transportation and determines whether the results from the single source are reliable.

31 Claims, 11 Drawing Sheets

AVAILABILITY PROCESSING IN A TRAVEL PLANNING SYSTEM

BACKGROUND

This invention relates to determining seat availability information from within a travel planning system.

A travel planning system makes use of many classes of information including scheduling, faring, and availability data. The scheduling data describes where and when a passenger may travel; the faring data defines how much a given travel itinerary will cost; and the availability data describes the travel provider's willingness to sell the travel for the given cost. The availability data is often affected by the travel provider's capacity and their prior sales of similar products at similar prices, and is analogous to a report on remaining inventory.

Sources of seat availability information include, but are not limited to, direct queries to external databases of seat availability information. Each source of availability information typically has associated fixed and marginal costs of obtaining information from that source, including computation, communication, time, and money. Further, each source may return answers with differing freshness, confidence, and validity properties.

Conventional travel planning systems begin travel planning by choosing a small number of flights, checking availability for the flights by querying the airline's yield management system directly, and then faring the available seats. They have no other source of seat availability information to query, and make no other use of the availability information than to eliminate the unavailable booking classes of the few preselected flights from further consideration.

SUMMARY

We have noted that there is generally a correlation between allowed booking classes for fares and the prices of the fares, leading to a loose notion of "expensive" booking codes and "cheap" booking codes. The cheaper booking codes and flights tend to be unavailable sooner, because an airline is generally more willing to sell seats in expensive booking codes than in cheap booking codes, and customers generally buy travel for as low a price as possible, and consequently quickly consuming the available inventory of cheaper seats. As a result, availability queries which are made involving only cheap booking codes or flights are more likely to result in finding no available seats, which is an undesired result for travel planning systems (but common in conventional systems).

According to an aspect of the invention, a travel planning system includes a scheduling process for determining a set of instances of transportation that satisfy a user query and a faring process that determines fares that are valid for at least some of instances in the set of instances of transportation. The planning system also includes an availability process that uses results from a single source of seat availability for a mode of transportation to determine a set of available instances of transportation and determines whether the results from the single source are reliable.

This invention uses multiple sources of seat availability information. Furthermore, due to the low cost associated with querying some sources of seat availability information, it is practical to make multiple sets of queries to availability sources. The invention permits use of inexpensive, but lower-quality data, to guide later queries to more expensive higher-quality data so as to reduce cost without reducing the quality of the final travel planning result. Additionally, instead of just eliminating booking classes on a small set of pre-chosen flights, this also enables the travel planning process to select more or better flights based on a first pass of computation and availability queries to be used in later passes of computation and availability queries. The accompanying computation could range from simple counts of available flights or seats to full additional scheduling and faring passes whose parameters are based on provisional speculative answers. This additional computation may be done by a travel planning server or alternately may be transmitted to a smart client to be processed.

The invention provides automatic techniques to detect the characteristics of the returned availability data so as to correctly interpret them. The availability system can include a set of techniques which allow a travel planning system to make cost-effective use of multiple sources of seat availability information to produce high-quality answers in response to travel planning queries such as airline reservations.

BRIEF DESCRIPTION OF THE DRAWINGS

FIG. 8 is a flow chart of a multiple iterative scheduling and faring process for checking availability.

DESCRIPTION

Figure 1:
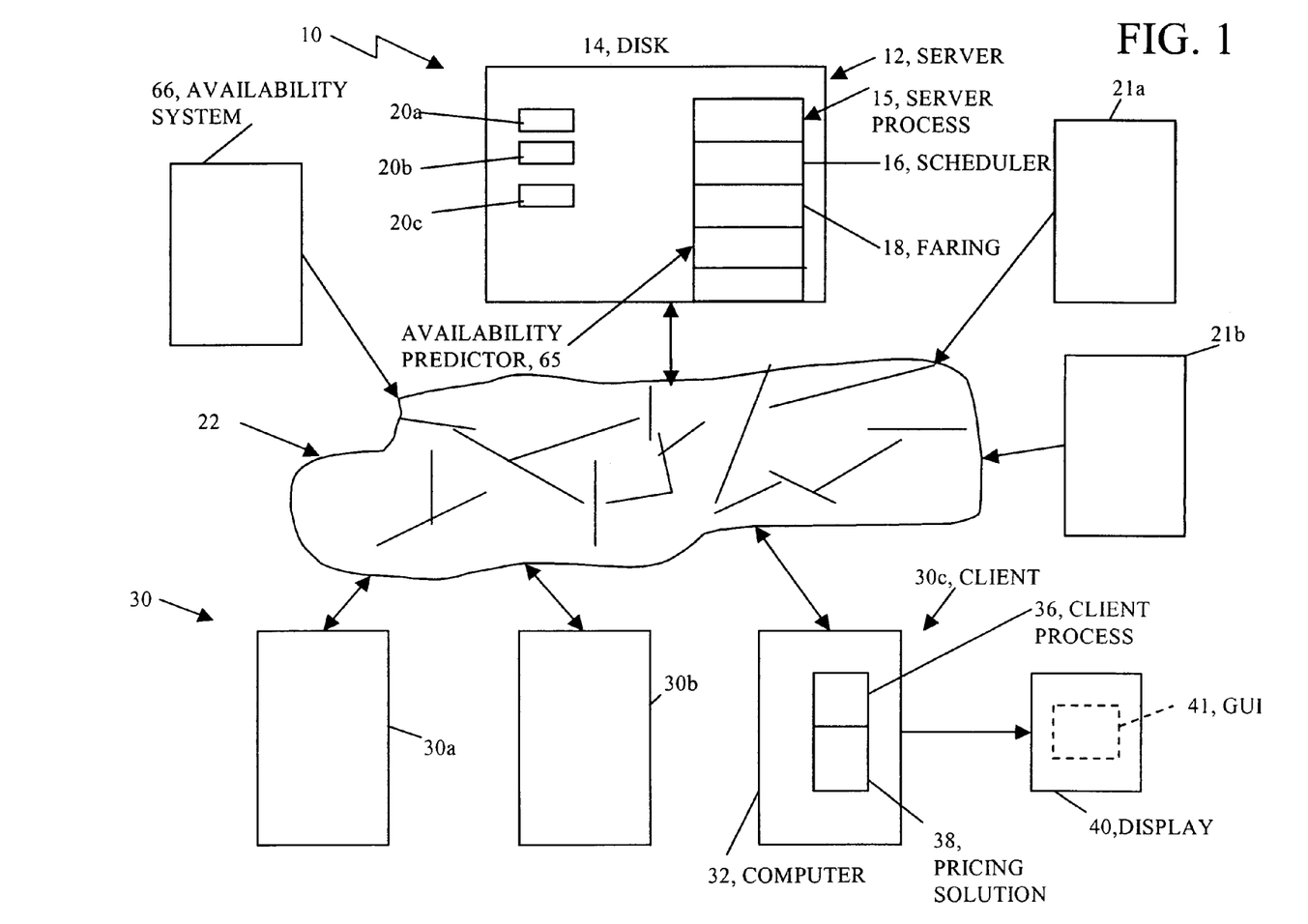
FIG. 1 is a block diagram of a travel planning system.

Referring now to FIG. 1, a travel planning system 10 is shown. The travel planning system 10 can be used with various forms of travel such as airline, bus and railroad and is particularly adapted for air travel. It includes a server computer 12 having a computer memory or storage media 14 storing a server process 15. The server process 15 includes a scheduler process 16 and a faring process 18. The scheduler process 16 is any scheduler process that will produce, from a travel request, sets of flights that can satisfy the request. The faring process 18 is any process that determines a set of valid fares. The server process 15 can also link a set of valid fares to flights to form a set of pricing solutions. Examples of the scheduler process 16 and the faring process 18 can be found in co-pending U.S. Patent Applications entitled "Scheduler System for Travel Planning System", Ser. No. 09/109,622, filed on Jul. 2, 1998 by Carl G. Demarcken et al., and U.S. patent application entitled "Travel Planning System", Ser. No. 09/109,327, filed on Jul. 2, 1998 by Carl G. Demarcken et al, both of which are assigned to the assignee of the present invention and incorporated herein by reference.

The travel planning system also includes a plurality of databases 20a, 20b which store industry standard information pertaining to travel, for example, airline, bus, railroad, etc. Database 20a can store flight information from a source such as the Standard Schedule Information Manual, whereas database 20b can store the Airline Traffic Publishing Company (ATPCO) database of published airline fares and their associated rules, routings and other provisions. The databases 20a, 20b are typically stored locally and updated periodically by the remote resources 21a, 21b. In addition, the system 10 can access an availability process 70 described below.

The system 10 also includes a plurality of clients 30a-30c implemented by terminals or preferably personal computers. The clients are coupled to the server 12, via a network 22, that is also used to couple the remote resources 21a-21b that supply databases 20a, 20b to the server 12. The network 22 can be any local or wide area network or an arrangement such as the Internet. Clients 30a, 30b are preferably smart clients. That is, using client 30c as an illustrative example, it may include a client computer system 32 including computer memory or storage medium 34 that stores a client process 36 and a set of pricing solutions. The set of pricing solutions 38 in one embodiment is provided from the server process 15 and comprises a set of fares that are valid for a journey and associated information linking the fares to the flight segments of the journey. In an alternative arrangement, the availability predictor 65 can be part of the client process 36.

The set of pricing solutions 38 is obtained from the server 12 in response to a user request sent from the client to the server 12. The server 12 executes the server process 15 using the scheduling process 16 and the faring process 18 as mentioned in the above-identified patent applications to produce the set of pricing solutions for a particular journey. If requested by a client, the server process will deliver the set of pricing solutions to the requesting client. Under control of the client process 36, the requesting client 30c can store and/or logically manipulate the set of pricing solutions to extract or display a subset of the set of pricing solutions, as a display representation on the monitor 40.

Figure 2:
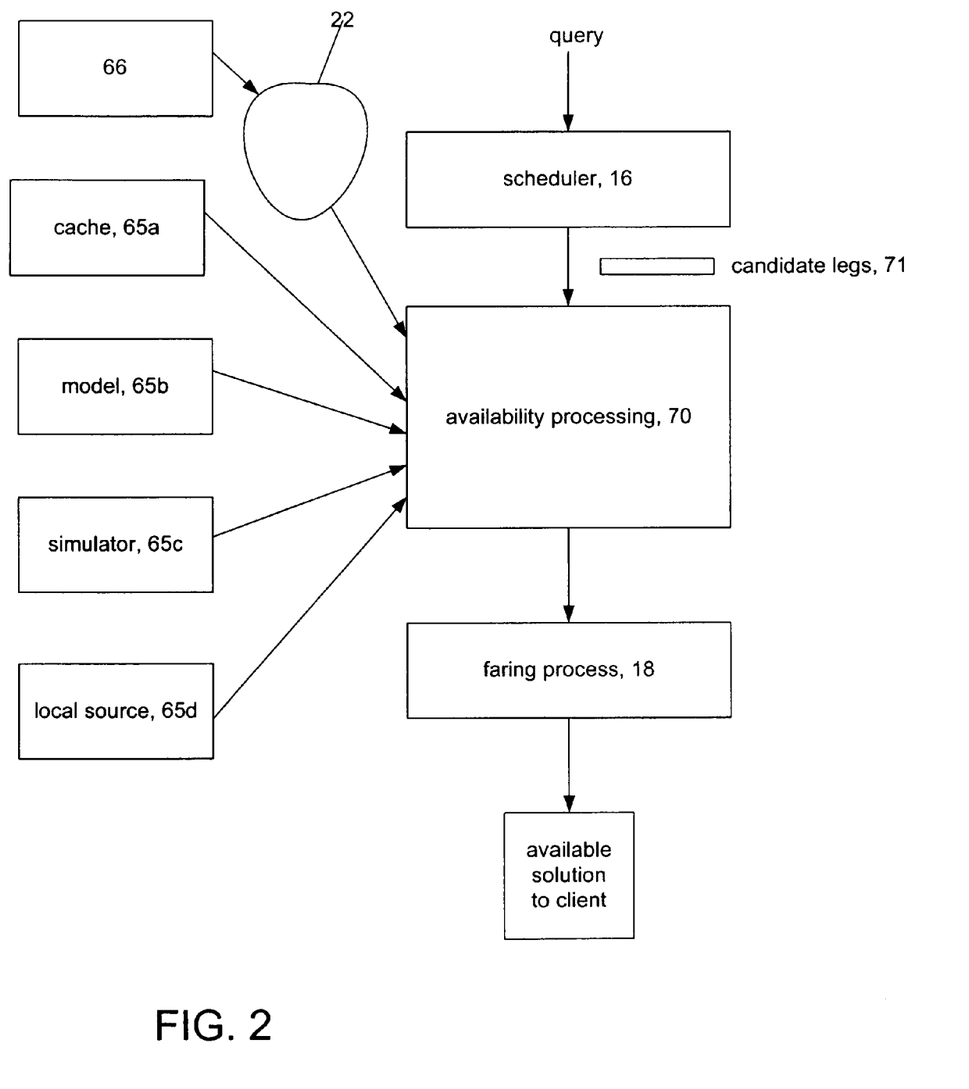
FIG. 2 is a block diagram of an travel planning system showing an availability process disposed after a scheduling process.

Referring to FIG. 2, an availability process that is part of the travel planning system 10 is shown. The travel planning system 10 has three main processes scheduling 16, checking availability 70, and faring 18. In this embodiment, an availability system 70 is disposed after the scheduling process 16. The scheduling process 16 produces a list of candidate legs 71, and the availability system 70 determines the availability of each. Based on the availability information, which reports the number of available seats in each booking class on every leg, the travel planning system 10 using the faring process 18 to match a fare to a given leg, only when the availability information indicates that a seat for the booking class is available. (e.g., if fare QE21NR requires booking class Q, the faring process will only attempt to use fare QE21NR on a leg if the leg has a seat (or as many seats as the customer requires) available in booking class Q).

As input to the scheduling process, a user through a query specifies constraints on the flights to be selected, such as origin and destination airports, travel dates and possibly times, preferred airlines, etc. The scheduling process 16 has access to the database 20a published by the airlines of scheduled flights containing the identifying information about every leg, where a leg is the smallest nondivisible part of a flight (i.e., exactly one takeoff and one landing). The set of legs forms a graph with airports as nodes and legs as edges; a graph search algorithm such as shortest-paths is used to find combinations of legs which provide travel from the user-specified origin to the user-specified destination which satisfy the user's other constraints and preferences; each such leg combination is called an itinerary. The scheduling process 16 outputs a list of itineraries.

The availability process 70 takes the list of itineraries (alternately referred to as schedules or legs). The availability subsystem has access to a source of availability data, and for each leg passed to it by the scheduler, the subsystem sends the identifying information about the leg (airline, flight number, origin, destination, departure date) to the availability process 70. The availability process 70 returns for each leg a list of booking classes and seat availability counts for each as described above. The availability subsystem annotates each leg with its availability information and outputs the set of annotated legs.

The faring process 18 takes the set of annotated legs, and additionally has access to fares and faring rules published by airlines. The faring process 18 selects and matches fares to the legs following the published rules for doing so. Some rules specify for each fare the permitted booking classes for that fare; that is, a fare can only be matched with a leg if the leg has nonzero seat availability in at least one of the permitted booking classes for the fare. Additional processing is performed in the faring process 18 to output a graph 71 containing legs and fares, with the structure of the graph encoding the relationships between them determined in the faring process. The graph 71 is transmitted to a client, which processes the graph 71 and in doing so selects a set of legs which exactly satisfy the user's original constraints on the travel and a set of fares which can be matched with those legs so that every leg has exactly one fare matched with it. The client can further optimize a user-specified function over the permissible travel solutions (sets of legs and matching fares), such as finding the cheapest solution or solutions or finding the solutions which minimize the total travel time. The client displays these solutions to the user.

The availability process 70 runs on the server 12 and access an availability system 66 of one or more airlines (generally each airline will have its own availability system) by sending availability queries over the network 22 (FIG. 1). The system 10 also includes other availability sources 65 such as an availability predictor based upon a cache or database of stored availability queries 65a, a predictive model of availability 65b and/or a simulation of an availability process 65c or an actual availability process 65d running as a local process to the server process 12. Such systems are described in U.S. patent application entitled "Method and Apparatus for Providing Availability of Airline Seats," Ser. No. 09/431,366 Filed Nov. 1, 1999 by Carl G. Demarcken et al assigned to the assignee of the present invention and incorporated herein by reference.

The different sources 65, 66 each have different properties, including the cost (in time, computation, communication, or money) of performing a query and the quality (age/freshness, confidence, precision, or validity). Sometimes all costs are negligible, such as when querying a cache; other times the costs are substantial, such as when submitting live queries directly to the airlines (costly in time, communication, and money since the airlines often charge a transaction fee). When a source is expensive, it is desirable to contain these costs.

Figure 3:
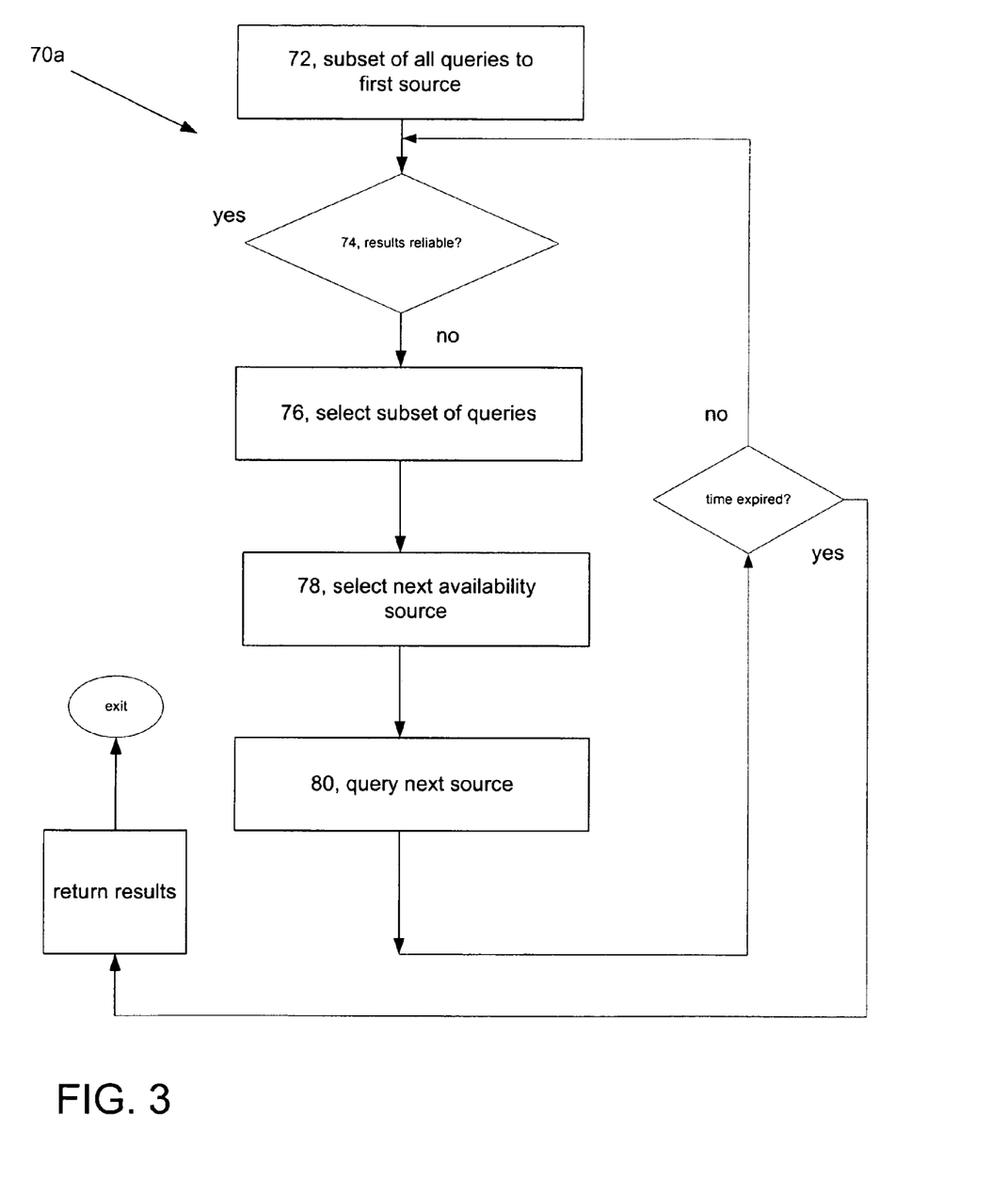
FIG. 3 is a flow chart of a process for checking availability using multiple sources of availability information.

Referring to FIG. 3, a process 70a for checking availability involves using multiple sources of availability information. Process 70a queries multiple sources sequentially. Process 70a submits 72 all queries to a first source. Process 70a determines 74 if results from the availability source are reliable. If the results are not reliable, the process 70a selects 76 a subset of the queries to send to a subsequent availability source. The process 70a selects the subset based on the results returned and other factors. The process 70a selects 78 another source and sends 80 the subset of queries to the other source. When the process 70a determines that all results or a portion of the results are reliable, it send the results to the travel planning system.

The process 70a sends a query to a second source, for instance, when the first source had no information or had a low confidence rating for its information about that query. Typically, the first sources are lower cost, lower quality sources, while the last sources are more expensive, higher quality sources. Not all queries will be submitted to all sources because of prohibitive cost. When the process 70a has availability information for a leg from more than one source, it uses the data gathered from the highest quality source.

One method for cost containment sets a hard cost limit and submitting queries (while keeping track of the costs) until 82 the cost would exceed the hard limit; other methods are explained below. For example, a timeout is set to limit the amount of time used by the availability checking stage, and computation proceeds with only whatever information was received before the timeout expired.

This method requires little computation by the travel planning server, but results can be poor when the cost containment measures prevent some of the queries from going through, because at times the queries eliminated are the ones which would be used in the best answers. This problem is addressed in later more advanced methods.

The process 70a is a sequential multi-stage query process. The process 70a first uses a cache or other predictive type source 66 to provide an initial set of queries and then performs a live query to airline yield management or availability systems 65. The cache queries are quick and cheap to perform, but can have stale or incorrect data. The live queries are expensive. Therefore, only a few can be made per travel planning session. However the live queries are up-to-date and correct.

Figure 3A:
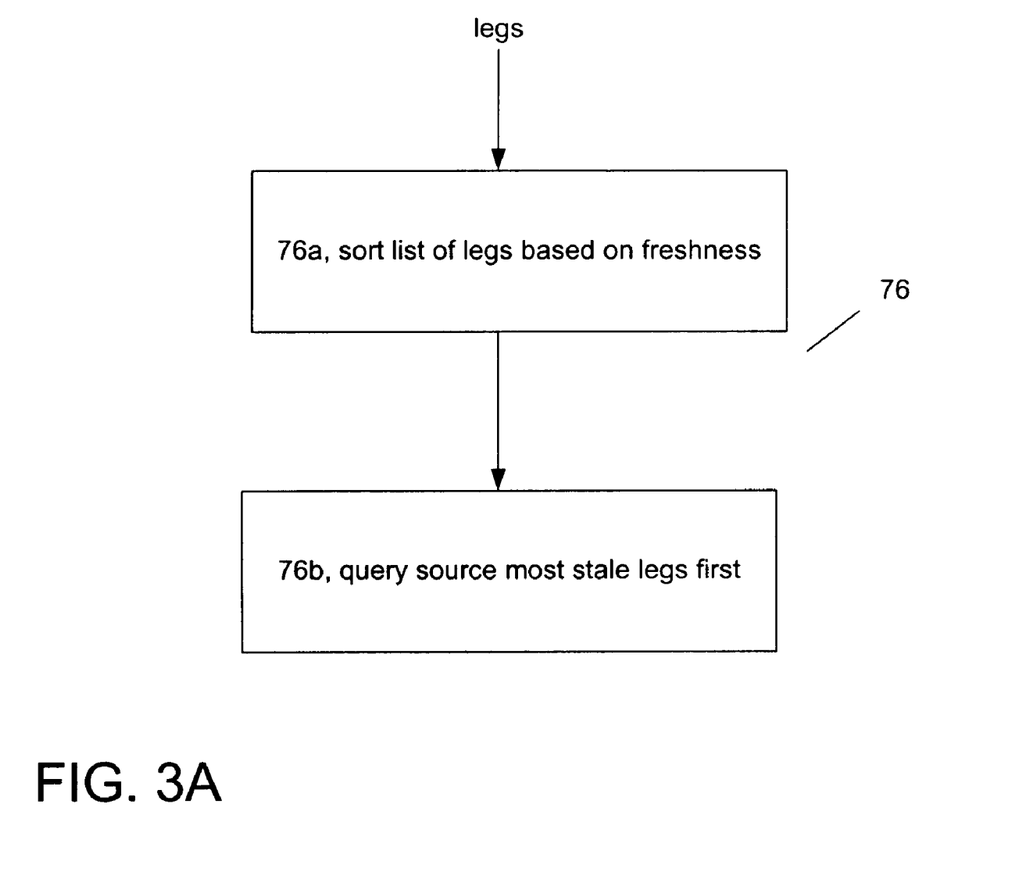
FIG. 3A is a flow chart of a process to select a subset of queries.

As shown in FIG. 3A, after the cache queries are completed, the process 76 sorts 76a the list of legs based on the freshness of the information returned by the cache, most stale first. The process 76 queries 76b the live data source on each of those legs in order (most stale first). Within a predetermined timeout period, the system stops the query process before all queries have been made to the live source. Because the list of legs was prioritized to put the lowest quality data first, the process 76 received fresh data about those legs first, and the minimum quality of information the system has about any leg was raised.

Alternatively, process 70a could prioritize the legs according to other properties of the data rather than freshness. The system can change the sort criteria in prioritizing legs. Other criterion for sorting include sorting by the minimum number of seats reported available in any of the leg's booking classes, in increasing order; this puts a leg with only one seat in some booking class ahead of a leg with 9 seats reported available in all booking classes, under the assumption that the booking class with only one seat is more likely to become unavailable in a short time than the booking class with several seats remaining.

This sort criterion would put the flights with one booking code fully sold out first. This may be desirable, since if the seats sold out they are likely to be desirable seats, and airlines do make more seats available periodically if a booking code sells out. However, if the property that the flights which are sold out appear first in line to be re-queried, the sort order can be changed to be "1234567890" (put 0 last but leave the rest unchanged). The general goal is to prioritize the legs so that the legs whose availability is most likely to have changed get the highest priority and are queried first.

Even more complicated criteria can use several features such as, freshness, cached availability, time until departure, market, day of week, airline, time since last change, and so forth, in combination to prioritize legs for determining availability. When the cost of submitting queries is low and there is more than one source of availability information, it can be advantageous to submit multiple simultaneous queries to the different sources and combine the results. This reduces the latency involved in submitting multiple queries to multiple sources in turn. In this case the queries sent to one source cannot depend on the answers from another when the sources are queried simultaneously. Instead, all queries can be sent to all sources, or alternately each query can be sent to some non-empty subset of the available sources, the particular subset for each decided either randomly or heuristically (e.g., send the first half of the queries under some arbitrary ordering to source 1 and the second half to source 2). When more than one source returns an answer for a specific query, the system can either preferentially choose one answer over the other (when the sources are not of equal quality); or it can average the seat availability counts returned for each booking class; or it can compute a weighted average of the seat availability counts where the weights are either specified for each source or are related to the confidence associated with the source's answer; or it can re-query a higher quality source when the lower-quality answers disagree.

Figure 4:
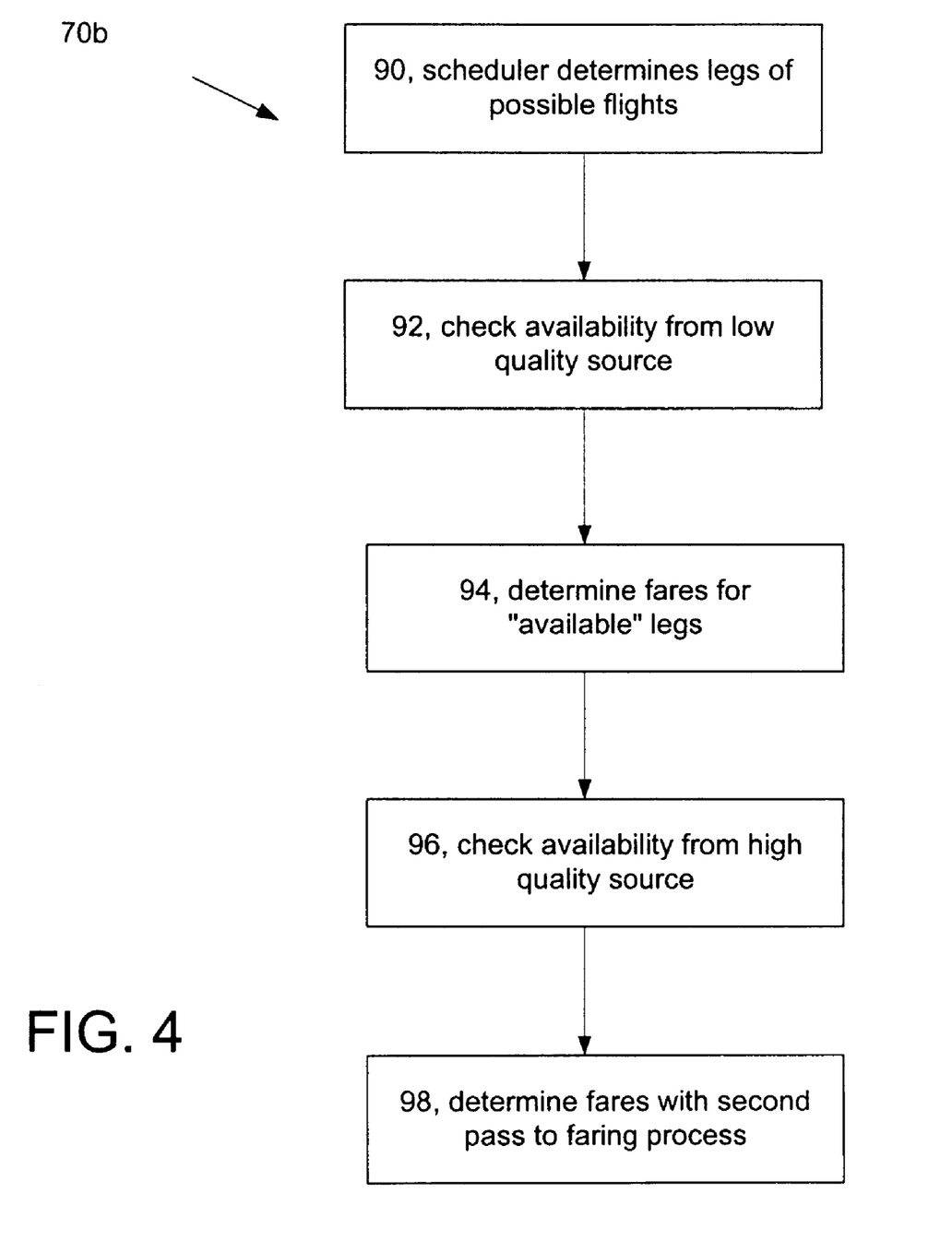
FIG. 4 is a flow chart of a process for checking availability after scheduling and after faring processes.

Referring to FIG. 4 a process 70b for checking availability after the scheduling and faring processes is shown. Assuming the goal of the travel planning system is to produce the lowest priced solutions, it would be desirable to prioritize the legs according to the best priced solution involving each leg; however, this effectively requires the ultimate answer to be known in advance.

Instead, the process 70b approximates that answer by determining 90 a set of flights using the scheduler, and checking 92 availability using a low quality, low cost availability source. The process 70b performs 94 the faring process using the lower quality availability results from the first source and noting the lowest priced solution which each leg is involved in. (When the faring system is as described in the U.S. Patent entitled "Travel Planning System," this lowest price can be read directly from the leg's node in the pricing graph after algorithm has been performed.) This lowest price is then used as the sort criterion to prioritize the legs for a second availability pass 96 and a second faring pass 98.

The answers after the first faring pass is completed are imperfect because the cached availability data is expected to be imperfect. However, since the cached data is a reasonable approximation of the true availability, the faring results are a reasonable approximation of the true prices, and this heuristic provides a good priority ordering of the legs which allows the system to produce answers which have a high confidence of being correct. This comes at the extra computational cost of performing the faring process twice.

One problem that needs to be avoided when selecting legs involved in the lowest-priced solutions is that if legs are selected individually and there are resource limits preventing all legs from being queried in the later pass, there is a chance that every cheap solution would be missing some legs. For example, if there are only two very cheap round trips (which cost the same), one on UA and one on AA, all four legs will have equal priority; and if the resource limits permit only two availability queries to be sent, the mechanism above may query the outbound legs of both but not the return legs for either. The result would be that neither cheap solution could be constructed from the high-confidence answers. To prevent this, the system enumerates full solutions and groups all legs involved in a solution together to be queried as a unit before querying other legs.

However, it may not be desirable to focus computation strictly on trying to find the absolute lowest priced answer; for instance, if demand is high and many of the cheapest seats available from the cache have sold out since the cache data was collected, the small number of queries made in the second availability pass may all return zero available seats in the inexpensive booking classes. If that happens, the server is left with only stale (low confidence) answers which are moderately priced and fresh (high confidence) answers which are expensive.

To avoid this the process 70b balances these two considerations lowest price and availability of solutions. The process 70b can make queries in the second availability pass which have a high probability of being available; this results in the system finding a greater number of solutions which are known to be correct answers (because they were generated with high-confidence answers). Since one goal of the travel planning system is to generate (correct) solutions with low prices, these two strategies can be mixed, both making "long shot" availability queries which are unlikely to be available but which save a lot of money if they are, and making "conservative" queries which will probably be available but which are more expensive. The "long shot" queries are just the least expensive legs when prioritized by least total solution price as above; since they are the cheapest they are often the least likely to be available.

Specifically, to select legs which are likely to be available, the system either uses a source which reports a probability that a particular booking class is available or a source which reports a probability distribution over seat availability counts and query the legs under consideration. These probabilities directly express the likelihood that a seat will be available in the booking class; if a distribution is received, the probability is 1.0 minus the probability that the availability count is 0 (equals the sum of the probabilities of the other seat availability counts). That is, prioritize according to the probability that the seat is available; the legs with the greatest probability are the legs most likely to be available. Note that if it is desired to use a source which does not supply confidence estimates or probability predictions, a predictor of the probabilities can be provided using the techniques described in U.S. patent application entitled "Method and Apparatus for Providing Availability of Airline Seats."

These two considerations—lowest price and finding available solutions are often at odds with each other. A mixed strategy of taking some legs according to one method and other legs according to the other is used to gain the advantages of each. For instance, half the legs can be chosen according to one and half according to the other. Another technique for mixing them is to quantize the availability probabilities into a fixed number of bins, for instance 10. Within each bin, the system select some number of legs which are involved in the cheapest solutions (that is, disable all legs with a lesser probability than the cutoff for the bin being processed and enumerates the least expensive solutions using the remaining legs). The system aggregates all legs generated by this process for querying to the higher quality source.

These methods are implicitly assuming the availability probabilities are independent, which is generally not the case. A much more complicated scheme which does not make this assumption would be to evaluate the effect of making a particular set of queries using Monte Carlo integration by sampling over the joint probability distribution of seat availabilities. A single sample is generated by randomly assigning each booking class in each seat to be available or not with probability as provided by an availability source. Then for each sample, compute the cheapest price using only the legs randomly assigned to be available. Generate many samples and compute the cheapest price for each, and average all the resulting prices. This average is the expected value of the solution produced by submitting the given set of availability queries to a high-confidence source and only using those high-confidence availability responses to generate a solution.

Using this Monte Carlo technique to compute the expected value of a set of availability queries, the system can evaluate and compare different sets of queries to choose the best (minimizing the expected value, which is in this case the expected cost of the travel). The system can also perform differential analyses using this technique to isolate the marginal effect of querying any given leg: compute the expected value of a set of availability queries including a leg, and compute the expected value of the same set of availability queries excluding that leg. This marginal value allows the travel planning system to assess the benefit gained by an additional query and compare it to the cost of performing the query (for instance, if each availability query to a high-quality source cost one cent), and make a cost-benefit tradeoff. Also, direct leg-to-leg comparisons can be made by swapping one leg for another and comparing the expected value before and after the swap. Using these techniques the system can progressively tailor a set of queries to be made, albeit at high computational cost to the travel planning system; note though that Monte Carlo integration is easily parallelized to multiple processors.

Figure 5:
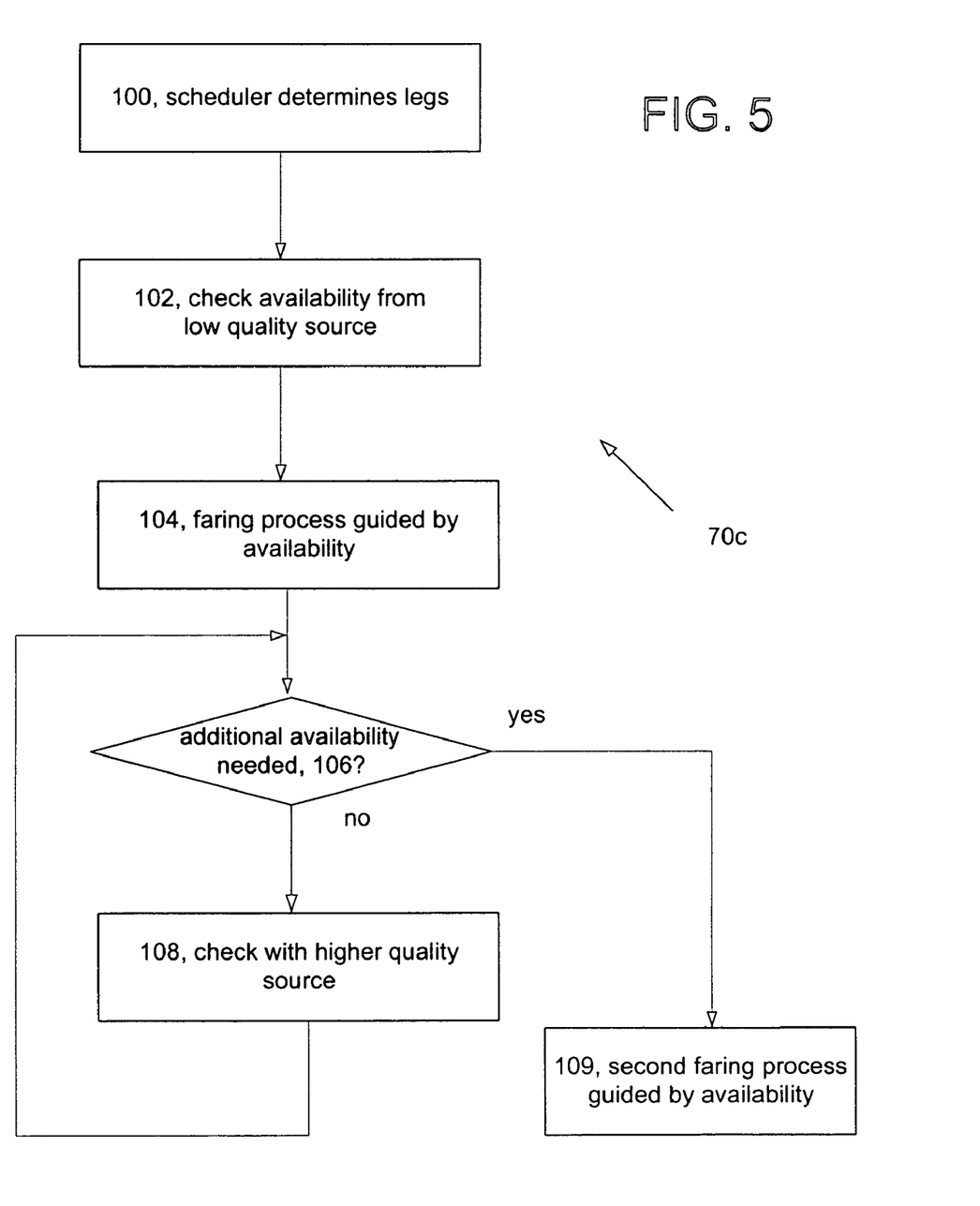
FIG. 5 is a flow chart of process for checking availability after scheduling and multiple faring process.

Referring to FIG. 5, a process 70c for determining availability after scheduling and using multiple faring process is shown. When there is a plurality of availability sources with different costs and different qualities of results, extra sets of availability checking and faring may be inserted into the process. This is especially useful when the high quality availability source is extremely expensive to query and it is very important to reduce those query costs. This ordering process makes even more careful use of the high-cost resources. In this process the order process determines a schedule 100 of possible legs of flights (assume all available) and checks 102 availability using a lower quality availability source. The process 70c then performs a first faring pass 104. Once that is completed the process 70c iteratively checks availability 106 guided by faring and prior availability results. The process 70c perform the subsequent availability checks 108 using higher quality availability sources. After the final check it can have a final faring process guided by all of the results 109.

Figure 6:
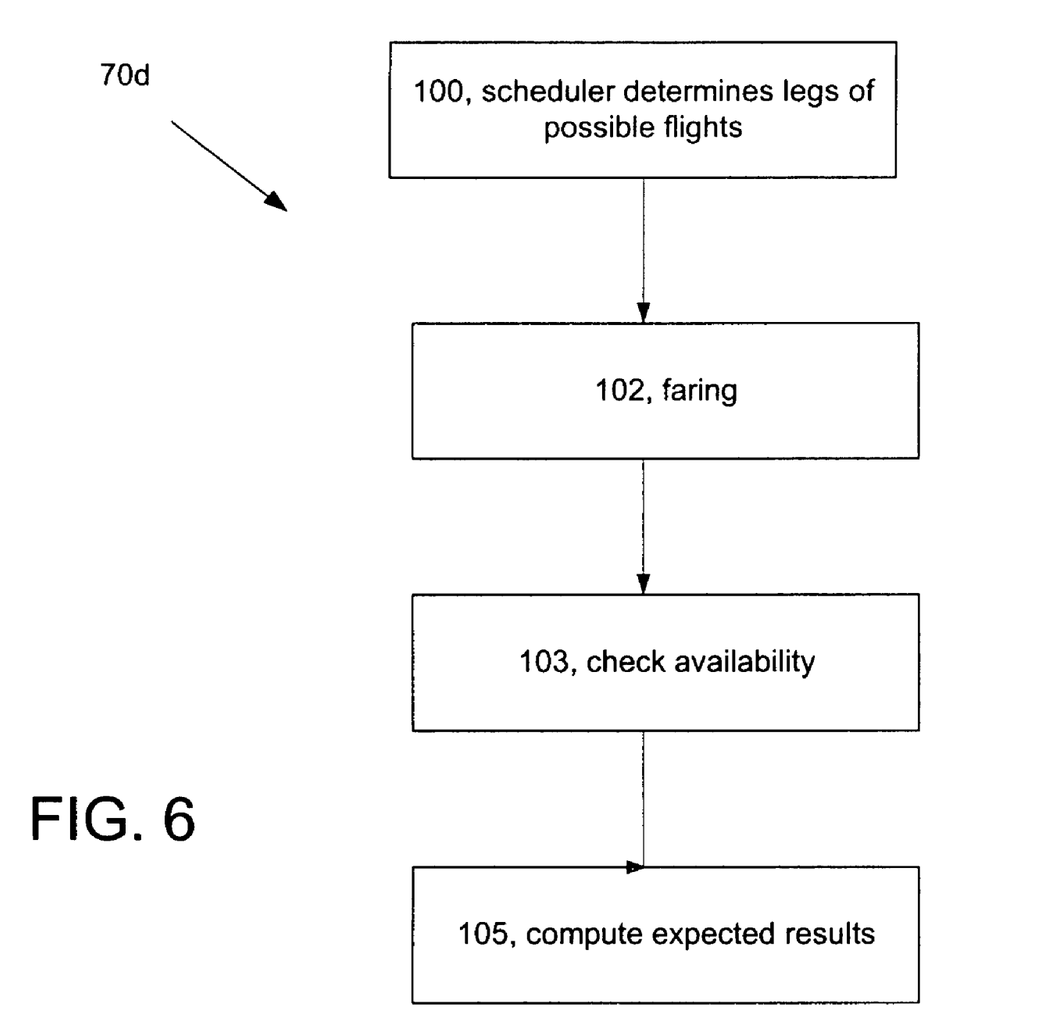
FIG. 6 is a flow chart of an after faring strategy using calculated expected results for checking availability.

Referring to FIG. 6, an After Faring process 70d for determining availability is shown. The process 70d for determining availability is slower, than the one in FIG. 5, but produces better results particularly when cache misses are common and small numbers of availability queries are made.

The ordering process ordering of operations for an "After Faring" strategy is shown. The process determines 100 legs using a scheduler and determines fares 102 using a faring process. The process 70d makes use of the low-quality low-cost source of availability information 103, assume every seat is available in every booking class. Computation proceeds as if the low-quality speculatively guessed data were high quality, in the sense that the origin of the data does not affect the computational processes. This process uses speculative computation 105 to determine results. Instead of spending the cost to acquire and process actual answers, the system speculates 105 as to what the answers might be and expends computation to ascertain what the results would be were the speculation true. Speculative computation has already been seen in the context of Monte-Carlo integration to compute the expected price discussed above.

Figure 7:
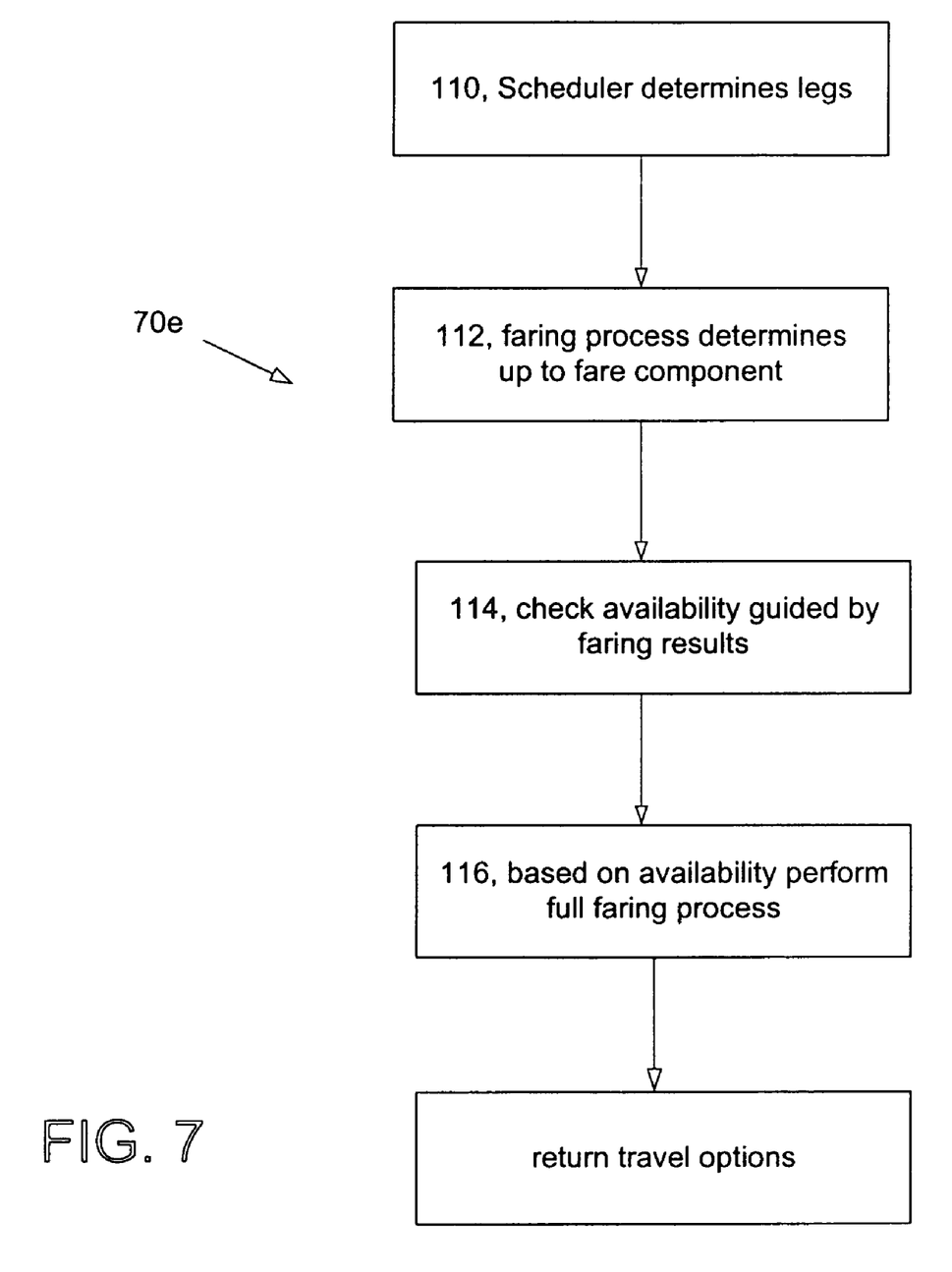
FIG. 7 is a flow chart of a process for an after partial faring process for checking availability.

Referring to FIG. 7, a process 70e for ordering of operations for "After Partial Faring" strategy is shown. This process 70e is particularly useful in the faring process described in the above mentioned application. The after partial faring process 70e determines 110 a schedule and assumes all are available. The process 70e performs 112 a first faring pass using only a fare-component processing. The process 70e checks 114 availability, guided by faring results and performs 116 a second faring pass performing complete faring processing.

A full faring pass is typically a computationally expensive operation to perform, and consumes nearly all of the computational resources of a travel planning server. To reduce the computational burden on the server process 70e as an alternative to the first faring pass, performs the first part of the faring operation, up to and including the fare component processing only. The results here are not as good as if a full faring pass were made instead of the partial pass because the solution pricing is less correct (PU-level and journey-level considerations are completely ignored). With this partial faring, but most of the somewhat substantial computation involved in performing a faring pass has been saved. This can exhibit a good tradeoff between computational cost, the cost of availability queries, and the quality of the final results.

A further optimization can be made to reduce computation by performing incremental faring computations. In the incremental faring pass, the process 70e recomputes only what is affected by changes (in availability and schedules) since an earlier faring pass. To achieve this, the state of the system before the first faring pass must be saved (availability and schedules), and both the faring results as well as important intermediate data structures involved in the faring computation must be preserved. To perform incremental faring, the process 70e compares the current state of schedules and availability to the stored state, and lists the differences. The process 70e performs all operations involving the data that differs (using the newer data), and compares the new results for all intermediate data structures to the stored values. The process 70e again performs only all computations dependent on the changed intermediate structures, etc., until the computation is complete. All computation which must be performed when a certain piece of data changes is the set of all operations reachable from that piece of data in a dataflow graph of the faring process. This strategy requires more memory to save the initial and intermediate states of the faring process and requires careful internal accounting of the processes involved, but can save a significant amount of computation especially when there are only a small number of changes in the availability and schedule data between the initial and incremental faring passes.

Figure 8:
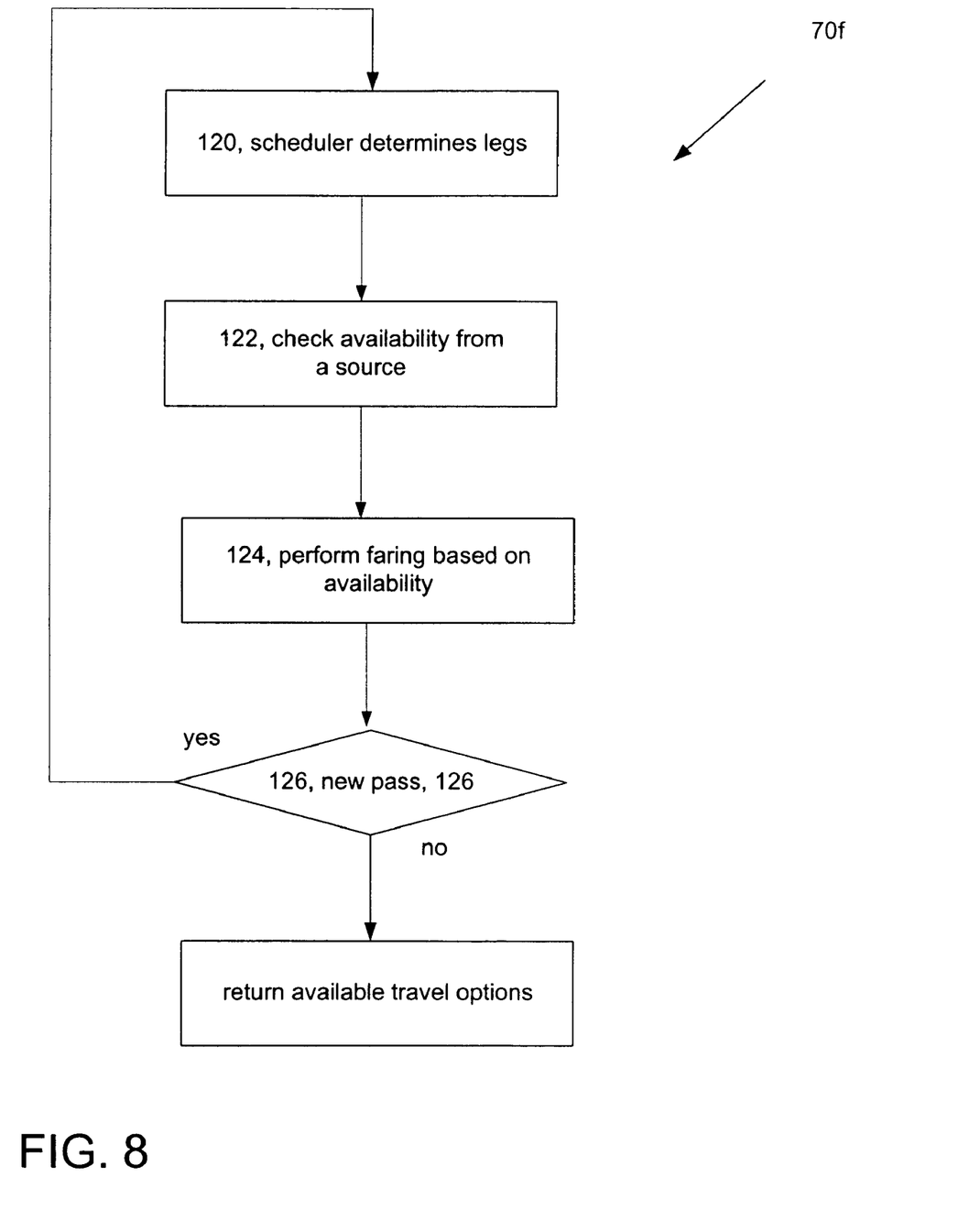

Referring to FIG. 8, an process for ordering of operations for "Multiple Iterative Scheduling and Faring" strategy is shown. The multiple iterative process 70f determines 120 a schedule from the scheduler process 16, and checks 122 availability from a low-quality low-cost source. The process 70f performs a first faring pass (complete or partial) 124 and optionally can iterative return 126 to the scheduler process and iteratively check availability, guided by faring results and performs a second faring pass. The process 70f can optionally go back to a second availability check & iterate again over another scheduling process. Generally the process 70f would use better sources of availability information based on the results from the prior processes.

Process 70f has the server perform multiple scheduling passes with an availability query pass between each scheduling pass and potentially a faring pass also between. The later scheduling passes are guided by the responses from the interposing availability queries and faring computations. When too many legs are found to be unavailable (either completely booked, or having most of the booking codes filled), the second scheduling pass (and possibly even additional passes) is performed to provide more legs to the system to keep the number of options large. Furthermore, the scheduler can search for substitutes legs for specific legs. For instance, if an isolated inexpensive solution were found in a faring pass but a leg in that solution were later determined to be unavailable, the scheduler can be directed to search for a replacement for that leg (e.g., a leg on the same airline in the same market, possibly but not necessarily around the same time or date) in hopes of being able to reconstruct the inexpensive solution.

Figure 9:
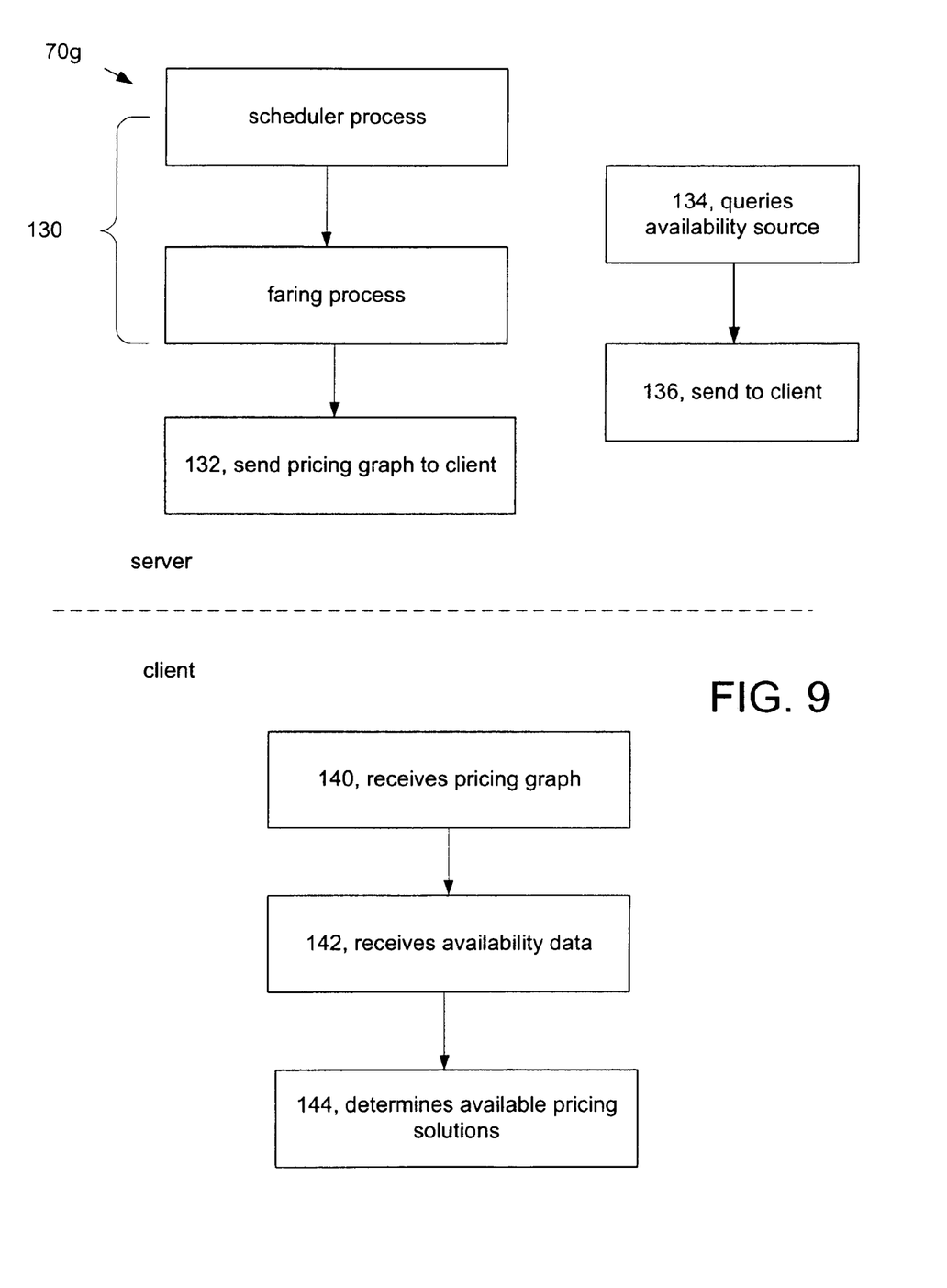
FIG. 9 is a flow chart of passing to client process for checking availability.

Referring to FIG. 9, a "Passing to Client" process 70g is shown. Instead of or in addition to processing the availability data in the travel planning server 12, the availability data may be passed along to a smart client for processing. The processing may be used to guide the client's computation or operation directly. The server 12 performs 130 the full processing of scheduling process 16 and faring process 18 without any availability information. The server 12 passes 132 the schedule and fare data to the client as usual, e.g., in a list or a pricing graph. Subsequent to this, the server 12 queries 134 an availability source or sources for availability data, and passes 136 the information retrieved directly to the client in an additional transfer of availability data. The client receives 140 the pricing graphs and availability data 142 and uses 144 the availability data to determine pricing solutions or available travel options.

Figure 10:
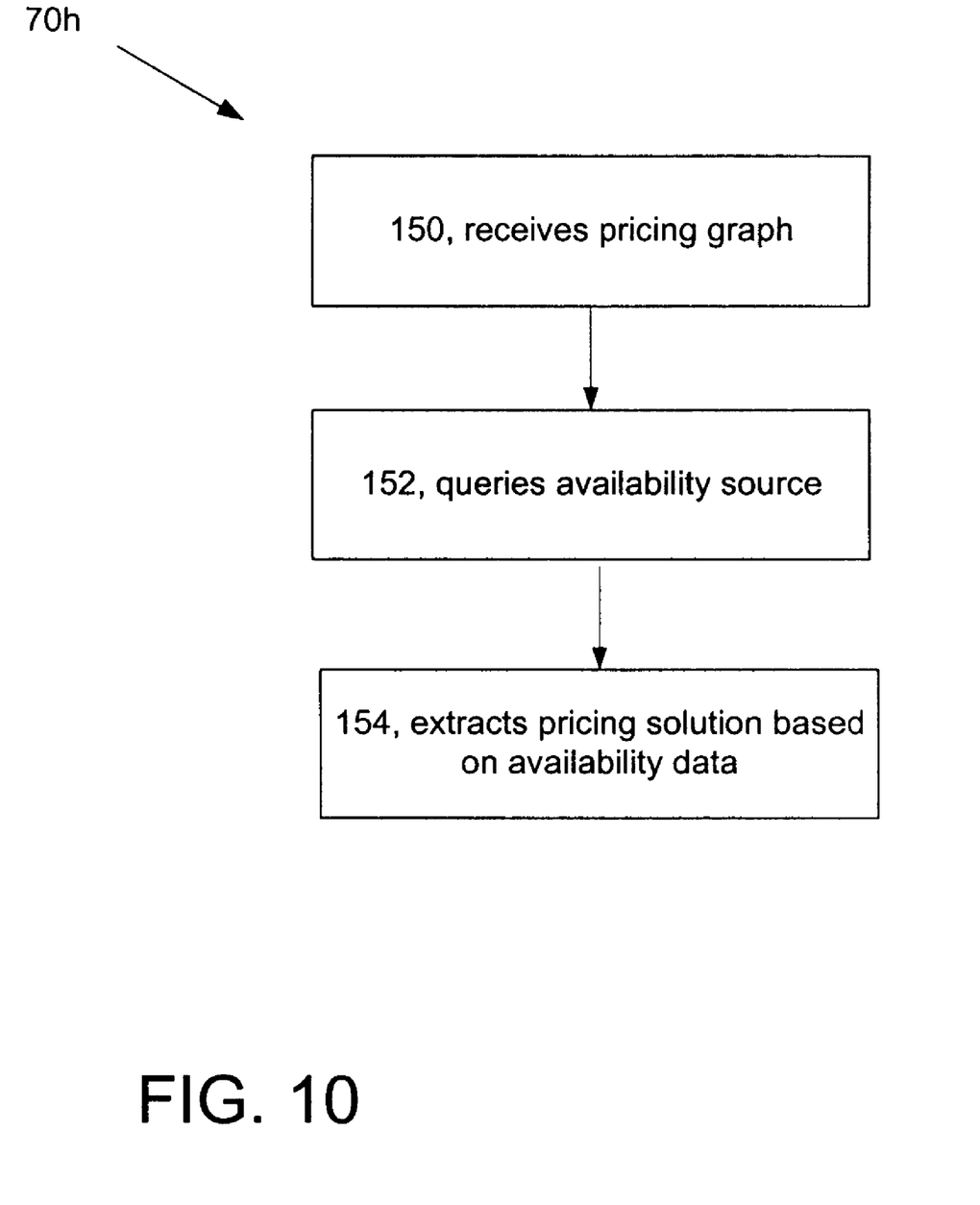
FIG. 10 is a flow chart of a process for ordering operations for a "Client Queries" strategy.

Referring to FIG. 10, an process 70h for client queries is shown. The client receives 140 the pricing graphs and availability data 142. In an alternate implementation, the client issues the availability queries rather than the server. Independent of whether the client or the server issues the availability queries, the client can perform its processing either taking or not taking into account the availability data, an option possibly controlled by the end user. Without using the availability data, the client generates individual or multiple solutions which may or may not be available. These solutions can be displayed to the user for informational and comparative purposes.

In FIGS. 9-10, the choice of flights to submit availability queries for may be guided by the scheduling results only as in FIG. 4, or they may be guided by the results of both the scheduling and faring stages as in FIGS. 5-8. When the client requests availability (not shown), the client performs pricing and enumeration computations to use to order or select availability queries to submit.

Furthermore, some sources of availability data include measures of confidence of the results (e.g., "a seat in Q is available with 80% certainty"). When present this certainty information is also passed along to the client for processing and display. When the user examines a particular flight or seat, the client can optionally display this data for informative purposes. When examining a set of flights or seats (as in a full travel itinerary) the client uses this information to compute the total probability that all seats involved are available: the joint probability is simply the product of the individual probabilities. Further, the client can be programmed to filter out seats and flights or combinations thereof with less than a specified probability of being available.

Other sources provide qualitative assessments of the certainty of the data (e.g., "probably available" or "definitely not available") rather than quantitative. In this case the client can perform the same operations qualitatively, such as displaying this information to the user. Alternately equivalent probabilities can be assigned to the qualitative measures (e.g. "definitely unavailable"=0%, "probably unavailable"=25%, "unknown"=50%, "probably available"=75%, "definitely available"=100% certainty) and perform the quantitative computation.

The availability data are usually pairs of booking classes and a number of available seats in that booking class, where the number is generally a single digit, ranging from 0 to a some value "N". That maximum value of N represents both the case when N seats are available and the case when more than N seats are available. However, the airline does not disclose what value of N they are using for a particular flight. N can range from as low as 4 to as high as 9; and this can be a problem if a customer is planning travel for more than N people. For instance, consider a flight which has 10 seats in booking class Q but which has N=4: the availability source will report "Q4." If 5 people are trying to travel on this flight, a naive system will incorrectly conclude that there is not enough availability in Q. However, the actual value of N can be extracted from the data automatically.

Typically actual value of N will depend on the airline and the type of airplane, but may also vary with other properties of the flight such as the market, flight number, and cabin (a cabin is a set of booking classes). Because the same N is used for all the booking classes in a single cabin on a flight and because the more expensive booking classes tend to have greater availability, the most expensive booking class in a cabin is a good source of information about the value of N for that cabin. Further, since flights in the distant future generally have greater availability, they are also good sources of information about the value of N. Thus, N can automatically be determined by careful sampling of the appropriate seat availabilities.

To automatically determine N for a given cabin and a particular set of flight characteristics (such as a given airline and airplane), query the availability of the most expensive booking class in that cabin on a large set of flights matching the given characteristics; select preferentially flights in the distant future, up to the limit of the availability data stored or computed by the airline. The maximum number of seats reported to be available in any of these flights can be used as a good estimate of the value of N. These values of N may be computed once and stored in the system for future use, and rechecked or recomputed in the future periodically or as the need arises. Instead of simply taking the maximum, more advanced statistical techniques for automatic clustering of data and detecting and removing outliers can be used to improve the quality of the estimate of N; see for example the textbook "Robust Statistics" by Peter J. Huber, Wiley, 1981.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A travel planning system comprises:
a computer system, comprising:
a processor; and
a memory storing processes for executing on the processor, the processes, comprising:
a scheduling process to provide a set of instances of transportation that satisfy a user query; and
an availability process that accesses seat availability information from multiple sources of seat availability information, receives the instances of transportation and uses results from a first source of the multiple sources of seat availability information for a mode of transportation to determine a set of instances of transportation for which a seat is available from the received instances of transportation;
determines quality properties of the availability information from the first source of seat availability information, with the quality properties including at least one of confidence, precision and validity; and
determines, based on the quality properties, whether the first source of seat availability information is reliable, and if the results are not reliable, the availability process executes a second set of seat availability queries to the first source or a different one of the multiple sources of seat availability information based on the outcome of determining quality properties, to provide a second set of instances of transportation for which a seat is available.

2. The travel planning system of claim 1 wherein if the availability process determines that the first source of seat availability information is reliable, the availability process returns the results.

3. The travel planning system of claim 1 wherein to execute a second set of seat availability queries to the first source or a different one of the multiple sources the availability process makes multiple, sequential seat availability queries to the first source or a different one of the multiple sources of seat availability information.

4. The travel planning system of claim 1 wherein to execute a second set of seat availability queries the availability process makes multiple simultaneous seat availability queries to multiple, ones of the multiple sources of seat availability information.

5. The travel planning system of claim 1 wherein the first source or a different one of the multiple sources of seat availability information have differing fixed and marginal costs associated with obtaining information, including computation, communication, time, and monetary-cost.

6. The travel planning system of claim 5 wherein the travel planning system controls costs by setting a threshold limit on the availability process to access the sources for at least one of the costs.

7. The travel planning system of claim 6 wherein the thresholds are timeouts or price limits.

8. The travel planning system of claim 7 wherein the availability process prioritizes queries to the first source or a different one of the multiple sources of seat availability information to remain under a specified cost limit.

9. The travel planning system of claim 1 wherein the first source or a different one of the multiple sources of seat availability information is a source of predicted availability information that generate replies with differing quality properties including at least one of freshness, confidence, precision, and validity.

10. The travel planning system of claim 1 wherein the availability process determines tradeoffs between the cost of a query and the properties of the response.

11. The travel planning system of claim 1 wherein fare information is determined and the travel planning system processes scheduling and fare information, and the scheduling and fare information along with availability data are sent to an intelligent client for further processing and integration by the client.

12. The travel planning system of claim 1 wherein probabilistic confidence bounds describing uncertainty in measurements of seat availability are placed on the quality properties.

13. The travel planning system of claim 1 wherein actual seat availability queries are sent to a source of airline seat availability information and are selected to increase the number of available solutions found or to increase the likelihood that the availability of the desirable solutions has been verified with high confidence.

14. The travel planning system of claim 1 wherein multiple responses, which contain different seat availability information and/or quality properties are simultaneously maintained in the travel planning system.

15. The travel planning system of claim 1 further comprising:
   a faring process that determines fares valid for at least some of the instances in the set of instances of transportation.

16. The travel planning system of claim 1 further comprising:
   a faring process that determines fares valid for at least some of the instances in the set of instances of transportation for which a seat is available.

17. The travel planning system of claim 1 further comprising:
   a faring process that determines fares valid for at least some of the instances in the set of instances of transportation and wherein the availability process is executed after the faring process.

18. The travel planning system of claim 1 further comprising:
   a faring process that determines fares valid for at least some of the instances in the set of instances of transportation for which a seat is available, and wherein the availability process is executed before the faring process.

19. A computer program product embodied on a computer readable medium for use with a travel planning system for determining availability of a seat for a mode of transportation, comprises instructions for causing a computer to:
   receive a set of instances of transportation that satisfy a user query;
   determine quality of a first set of seat availability information from a first source of availability information to guide a travel planning system to determine a subsequent set of instances of transportation for which a seat is available, and if the quality of the seat availability information is low, execute a second set of seat availability queries to the first source or a different source of seat availability information to provide a second set of seat availability information from the first source or the different source of seat availability information; and
   produce from the second set of seat availability information and a set of the instances of transportation, a set of instances of transportation, for which a seat is available.

20. The computer program product of claim 19 further comprising instructions to:
   send the second set of seat availability queries to a different higher quality source of seat availability information if the results from the first source are low quality.

21. The computer program product of claim 19 further comprising instructions to:
   send multiple, sequential seat availability queries to multiple ones of the multiple sources of seat availability information, with at least one of the multiple ones of the multiple sources being predictor sources of seat availability information.

22. The computer program product of claim 19 wherein the multiple sources of seat availability information have differing fixed and marginal costs associated with obtaining information, including computation, communication, time, and charges and the program further comprising instructions to:
   set a threshold limit to access the sources for at least one of the costs.

23. The computer program product of claim 19 wherein the multiple sources of seat availability information generate seat availability information with differing quality properties including at least one of freshness, confidence, precision, and validity.

24. The computer program product of claim 19 further comprising instructions to:
   determine tradeoffs between the cost of a query and the properties of the seat availability information.

25. A method executed in a computer system for determining availability of a seat for a mode of transportation, comprises:
   producing in the computer system a first set of seat availability queries, to send to a first source of seat availability information for a first set of instances of transportation;
   evaluating in the computer system a quality measure of seat availability information received from the first source of seat availability information, to guide a travel planning system in determining a set of instances of transportation for which a seat is available by:
   producing in the computer system a second set of seat availability queries, to send to a different source of seat availability information based on evaluating quality of the availability information to provide the set of instances of transportation for which a seat is available.

26. The method of claim 25 further comprising:
   receiving the set of instances of transportation from a travel planning system in response to a user query.

27. The method of claim 25 further comprising:
   sending the second set of seat availability queries to a different source of seat availability information if the results from the first source do not have a sufficient level of quality.

28. The method of claim 25 further comprising:
   sending multiple, sequential seat availability queries to multiple sources that predict seat availability information.

29. The method of claim 25 wherein the sources of seat availability information have differing fixed and marginal costs associated with obtaining information, including computation, communication, time, and charges and the method further comprises:
   setting a threshold limit to access the sources for at least one of the costs.

30. The method of claim 25 wherein the sources of seat availability information generate seat availability information with differing quality properties including at least one of freshness, confidence, precision, and validity.

31. The method of claim 25 further comprising:
   determining tradeoffs between the cost of a query and the properties of the seat availability information.

* * * * *